United States Patent
Raphael

(10) Patent No.: US 9,602,703 B1
(45) Date of Patent: Mar. 21, 2017

(54) CAMERA SYSTEM

(71) Applicant: GM GLOBAL TECHNOLOGY OPERATIONS LLC, Detroit, MI (US)

(72) Inventor: Eric L. Raphael, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/951,711

(22) Filed: Nov. 25, 2015

(51) Int. Cl.
  *G03B 17/56* (2006.01)
  *H04N 5/225* (2006.01)

(52) U.S. Cl.
  CPC ......... *H04N 5/2252* (2013.01); *H04N 5/2254* (2013.01)

(58) Field of Classification Search
  CPC ..... H04N 5/2252; H04N 5/2254; G03B 17/56
  See application file for complete search history.

(56) References Cited

U.S. PATENT DOCUMENTS

| | | | |
|---|---|---|---|
| 6,607,606 B2 | 8/2003 | Bronson | |
| 7,492,410 B2 * | 2/2009 | Wakabayashi | H04N 5/2254 348/362 |
| 7,810,511 B2 | 10/2010 | Fagrenius et al. | |
| 7,856,693 B1 | 12/2010 | Johnson | |
| 8,567,963 B1 | 10/2013 | Criscuolo et al. | |
| 2007/0195185 A1 * | 8/2007 | Onuki | H04N 5/23293 348/333.02 |

FOREIGN PATENT DOCUMENTS

| | | |
|---|---|---|
| CA | 2719446 A1 | 10/2011 |
| WO | 2005096091 A1 | 10/2005 |
| WO | 2007132299 A1 | 11/2007 |
| WO | 2012003083 A1 | 1/2012 |

* cited by examiner

*Primary Examiner* — Tuan Ho
(74) *Attorney, Agent, or Firm* — Quinn Law Group, PLLC

(57) ABSTRACT

A camera system includes a body defining a cavity and a camera attached to the body within the cavity and including a lens and a ring surrounding the lens. The camera system includes a wiper assembly attached to the camera and configured for clearing debris from the lens. The wiper assembly includes a wiper configured for contacting and wiping the lens and having a first end and a second end spaced apart from the first end. The wiper is rotatable about a pivot axis between a stowed position in which the wiper contacts the ring and a deployed position in which the wiper contacts the lens. The wiper assembly also includes a counterweight attached to the second end and configured for disposing the wiper in the deployed position, and a resilient member disposed adjacent the ring and configured for disposing the wiper in the stowed position.

19 Claims, 2 Drawing Sheets

US 9,602,703 B1

CAMERA SYSTEM

TECHNICAL FIELD

The disclosure relates to a camera system.

BACKGROUND

Devices may include camera systems configured to monitor conditions exterior to the device. For example, camera systems such as security camera systems and vehicle camera systems may monitor a position of objects, may detect motion near the camera system, and/or may monitor road surface conditions. Since many devices operate in wet and/or dirty environments, such camera systems are often exposed to moisture, debris, and/or surface contaminants that may diminish a quality of an image produced by the camera system.

SUMMARY

A camera system includes a camera and a body defining a cavity. The camera is attached to the body within the cavity and includes a lens and a ring surrounding the lens. The camera system also includes a wiper assembly attached to the camera and configured for clearing debris from the lens. The wiper assembly includes a wiper configured for contacting and wiping the lens and having a first end and a second end spaced apart from the first end. The wiper is rotatable about a pivot axis between a stowed position in which the wiper contacts the ring and a deployed position in which the wiper contacts the lens. The wiper assembly also includes a counterweight attached to the second end and configured for disposing the wiper in the deployed position. In addition, the wiper assembly includes a resilient member attached to the ring and configured for disposing the wiper in the stowed position.

In one embodiment, the counterweight is rotatable with respect to the ring about an axis of rotation between a first position and a second position, and has a mass that is eccentrically distributed about the axis of rotation. The counterweight covers and is spaced apart from the ring to define a channel therebetween. Further, the resilient member is configured for rotating the counterweight from the second position to the first position, and is attached to the ring and the counterweight. The wiper is rotatable about a pivot axis between a stowed position in which the first end is disposed within the channel such that the wiper contacts the ring when the counterweight is disposed in the first position, and a deployed position in which the first end is not disposed within the channel such that the wiper contacts the lens when the counterweight is disposed in the second position.

In another embodiment, the wiper assembly includes a plurality of wipers each configured for contacting and wiping the lens and each having a first end and a second end spaced apart from the first end. Each of the plurality of wipers is rotatable about a respective one of a plurality of pivot axes between a stowed position in which the wiper contacts the ring and a deployed position in which the wiper contacts the lens. The counterweight is attached to the plurality of wipers and is configured for disposing the plurality of wipers in the deployed position. The counterweight is rotatable with respect to the ring about an axis of rotation between a first position in which each of the plurality of wipers is disposed the stowed position, and a second position in which each of the plurality of wipers is disposed in the deployed position. The resilient member is disposed within the channel and is attached to the ring and the counterweight.

The above features and advantages and other features and advantages of the present disclosure will be readily apparent from the following detailed description of the preferred embodiments and best modes for carrying out the present disclosure when taken in connection with the accompanying drawings and appended claims.

DETAILED DESCRIPTION

Figure 1:
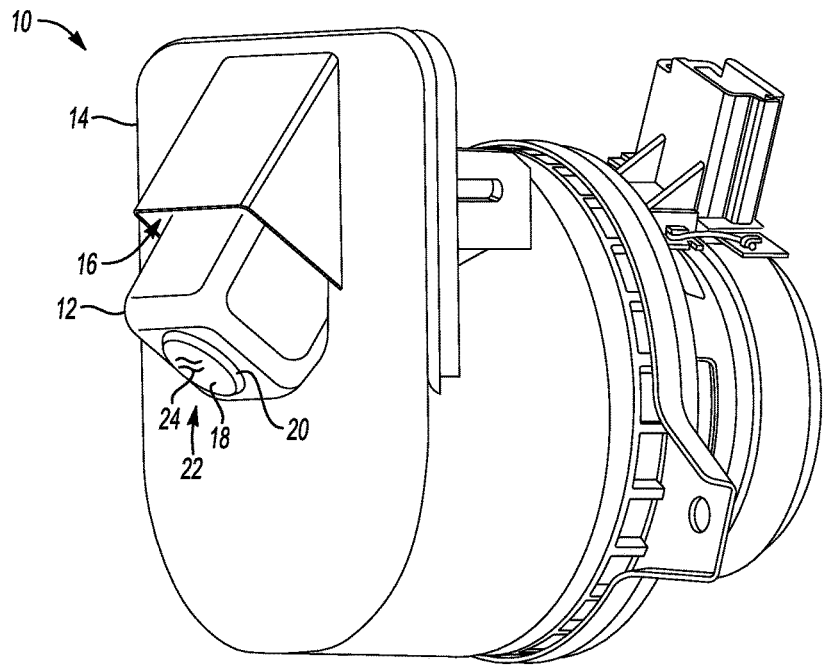
FIG. 1 is a schematic illustration of a perspective view of a camera system.

Referring to the Figures, wherein like reference numerals refer to like elements, a camera system 10 is shown generally in FIG. 1. The camera system 10 may be useful for non-automotive applications such as remote monitoring applications and security applications for industrial devices or aircraft. Alternatively, the camera system 10 may be useful for other vehicles, such as automotive vehicles, that require a camera 12 that is operable in harsh environmental conditions, e.g., a rear-view vehicle camera. For example, the camera system 10 may be useful in dusty, dirty, icy, salty, and/or wet operating environments.

As described with reference to FIG. 1, the camera system 10 may be situated at any location on an exterior of any device and may be arranged to provide monitoring of, for example, motion, weather conditions, a relative position of an object with respect to the device, road surface conditions, traffic conditions, and/or a presence of an object external or adjacent to the device. Therefore, the camera system 10 may be a component of a security system, a monitoring system, a wireless communications system, an autonomous driving system, an automotive lane departure alert system, and/or an object detection system for the device. For example, in one non-limiting example, the device may be a vehicle, and the camera system 10 may be a rearview or backup camera system configured for monitoring conditions during forward or reverse travel of the vehicle.

As described with continued reference to FIG. 1, the camera system 10 includes a body 14 defining a cavity 16. For example, although not shown, the body 14 may be a rear hatch or a front fascia of a vehicle. Alternatively, although also not shown, the body 14 may be an external housing of a security device, such as a surveillance device.

The camera system 10 also includes the camera 12 attached to the body 14 within the cavity 16. As best shown in FIGS. 2-5, the camera 12 includes a lens 18 and a ring 20 surrounding the lens 18. Generally, the lens 18 may be an optical lens having a field of vision, e.g., in front of the camera 12, and may be configured for collecting light so that the camera 12 may produce an image. The ring 20 surrounds the lens 18 and may support, protect, and/or maintain a position of the lens 18 during operation of the camera 12. The ring 20 may be a portion of the camera 12 or may form a peripheral part of the lens 18. In addition, although not shown, the camera system 10 may include a plurality of cameras 12, e.g., two or more cameras 12 attached to the body 14 within a respective one of a plurality of cavities 16 (not shown).

In one embodiment described with reference to FIG. 1, the camera 12 may at least partially protrude from the cavity 16 so that the lens 18 is continuously disposed external to the cavity 16. Further, the camera 12 may be fixedly attached to the body 14 such that the camera 12 does not rotate or translate with respect to the body 14. That is, the camera 12 may be stationary with respect to the body 14, and may not, for example, pivot or deploy into position during use.

Referring now to FIGS. 2-5, the camera system 10 also includes a wiper assembly 22 attached to the camera 12 and configured for clearing debris (shown generally at 24 in FIGS. 1 and 3) from the lens 18. For example, the debris 24 may be water, ice, fog, dirt, dust, salt, particles, smudges, objects, and combinations thereof. As such, the wiper assembly 22 may clean and protect the lens 18 to ensure that a viewable image is produced by the camera 12, even during dusty, dirty, wet, and/or freezing operating conditions. In addition, although not shown, the camera system 10 may include a plurality of wiper assemblies 22, e.g., two or more wiper assemblies 22 attached to the camera 12.

The wiper assembly 22 may be characterized as spring-loaded and may autonomously clean the lens 18 without requiring electrical power. That is, the wiper assembly 22 may be mechanically activated in response to motion of the camera 12, e.g., motion of a vehicle as it translates along a discontinuity in a surface or motion of a security camera as it scans a horizon.

More specifically, as described with reference to FIG. 2, the wiper assembly 22 includes a wiper 26 configured for contacting and wiping the lens 18 and having a first end 28 and a second end 30 spaced apart from the first end 28. The wiper 26 is rotatable about a pivot axis 32 between a stowed position 34 (FIG. 2) in which the wiper 26 contacts the ring 20 and a deployed position 36 (shown in phantom in FIG. 2) in which the wiper 26 contacts the lens 18. That is, the wiper 26 may not contact the lens 18 in the stowed position 34, and the wiper 26 may be selectively deployable. More specifically, the wiper 26 may respond to a mechanical stimulus, e.g., a jolt, jostle, jounce, or vertical motion of the camera 12, and pivot from the stowed position 34 to the deployed position 36, as set forth in more detail below.

Figure 2:
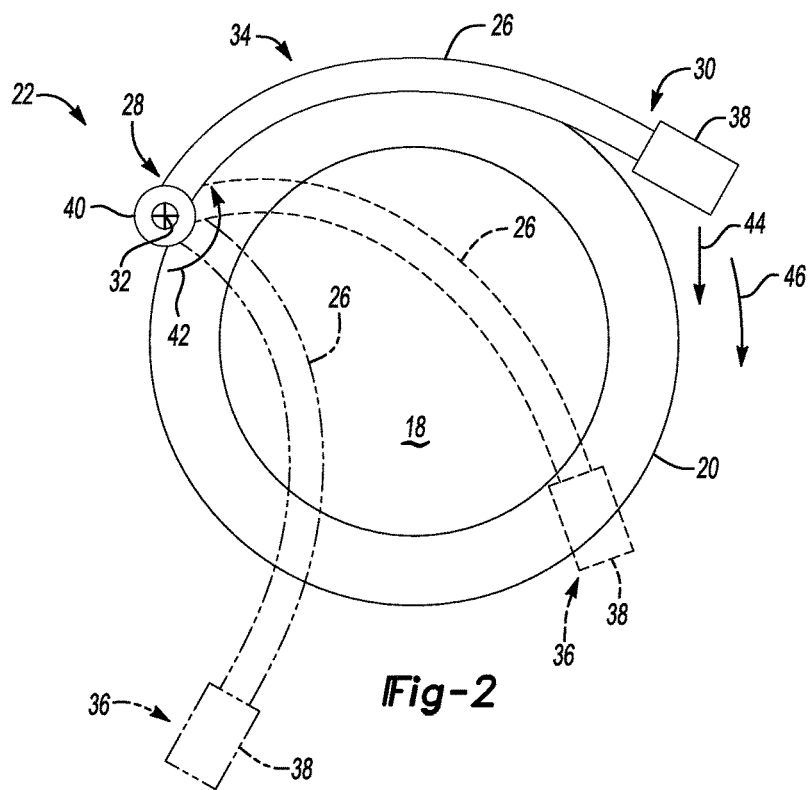
FIG. 2 is a schematic illustration of an end view of a wiper assembly of the camera system of FIG. 1.

As shown in FIG. 2, the wiper 26 may have a curvilinear shape that conforms to the lens 18 when the wiper 26 is disposed in the deployed position 36. The wiper 26 may be formed from an elastomeric material such as rubber, and the wiper 26 may be removable from the wiper assembly 22 for replacement or maintenance. In one embodiment, the wiper assembly 22 includes exactly one wiper 26. However, in another embodiment, the wiper assembly 22 may include a plurality of wipers 26, e.g., three wipers 26, as set forth in more detail below.

Referring again to FIG. 2, the wiper assembly 22 further includes a counterweight 38 attached to the second end 30 and configured for disposing the wiper 26 in the deployed position 36. In addition, the wiper assembly 22 includes a resilient member 40 attached to the ring 20 and configured for disposing the wiper 26 in the stowed position 34. That is, the resilient member 40 may balance or predispose the wiper 26 in the stowed position 34 until the camera 12 is jostled or bumped and the counterweight 38 pivots the wiper 26 to the deployed position 36. Stated differently, the counterweight 38 may overcome the spring force 42 of the resilient member 40 when the camera 12 is jostled.

More specifically, the pivot axis 32 about which the wiper 26 rotates may be perpendicular to the ring 20. That is, as shown in FIG. 2, the pivot axis 32 may extend out of the page such that the pivot axis 32 is normal to a surface of the ring 20. The resilient member 40 may be a spring, such as a torsion spring, and may be rotatable about the pivot axis 32. In particular, one end of the resilient member 40 may be attached to the ring 20 and another end of the resilient member 40 may be attached to the wiper 26. Further, the resilient member 40 may have a spring force (indicated generally at 42) that biases the wiper 26 to the stowed position 34. That is, the counterweight 38 may have a weight (indicated generally at 44), i.e., the gravitational force exerted on the counterweight 38, and the spring force 42 may be equal to the weight 44 when the camera 12 is stationary and the wiper 26 is disposed in the stowed position 34. Conversely, the weight 44 may be greater than the spring force 42 when the wiper 26 rotates from the stowed position 34 to the deployed position 36, i.e., in the direction of arrow 46.

Therefore, the wiper 26 may be solely mechanically activated or actuated. For example, when the camera 12 is stationary or subjected to only minor jostling, the wiper 26 may remain disposed in the stowed position 34. However, as the camera 12 is jostled to an extent in which the weight 44 of the counterweight 38 overcomes the spring force 42 of the resilient member 40, the wiper 26 may pivot to the deployed position 36 and thereby wipe the lens 18 to clear debris 24 from the lens 18. After the wiper 26 travels across the lens 18, the spring force 42 of the resilient member 40 may then be greater than the weight 44 of the counterweight 38 such that the resilient member 40 then returns the wiper 26 to the stowed position 34. It is to be appreciated that the wiper 26 may also contact and wipe the lens 18 again as the wiper 26 returns from the deployed position 36 to the stowed position 34.

Therefore, the camera system 10 may autonomously clear debris 24 from the lens 18 when the camera 12 is jostled without requiring an electronic or thermal stimulus. As such, the camera system 10 may be useful for automotive or industrial vehicle applications in which a vehicle travels across an uneven surface while operating in a dusty, wet, and/or dirty environment. That is, a vehicle jounce or vertical movement may actuate the wiper assembly 22. Similarly, the camera system 10 may be useful for security monitoring or consumer communications applications in which the camera 12 is periodically or remotely jostled or vibrated during use.

In another embodiment described with reference to FIGS. 3-5, the counterweight 138 covers the ring 20. Further, the counterweight 38 is spaced apart from the ring 20 to define a channel 48 therebetween. For this embodiment, the counterweight 138 is rotatable with respect to the ring 20 about an axis of rotation 50 between a first position 52 (FIG. 3) and a second position 54 (FIG. 5). Further, the counterweight 38 has a mass that is eccentrically distributed about the axis of rotation 50. That is, the counterweight 38 may have a circular shape and the mass of the counterweight 138 may be unevenly distributed about the circumference of the counterweight 138. Therefore, a center of mass of the counterweight 138 may be different than a geometric center of the counterweight 138. As such, although the counterweight 138 may rotate along the ring 20, the counterweight 138 may be biased or predisposed to rotate to and rest in one position, e.g., the first position 52.

In this embodiment, the resilient member 40 is configured for rotating the counterweight 138 from the second position 54 to the first position 52 and may be disposed within the channel 48. That is, the resilient member 40 may be configured for returning the counterweight 138 to the first position 52. For this embodiment, the resilient member 40 is attached to the ring 20 and the counterweight 138 within the channel 48. For example, the resilient member 40 may be a spring such as a torsion spring, so that one end of the resilient member 40 is attached to the ring 20 and the other end of the resilient member 40 is attached to the counterweight 138.

Figure 3:
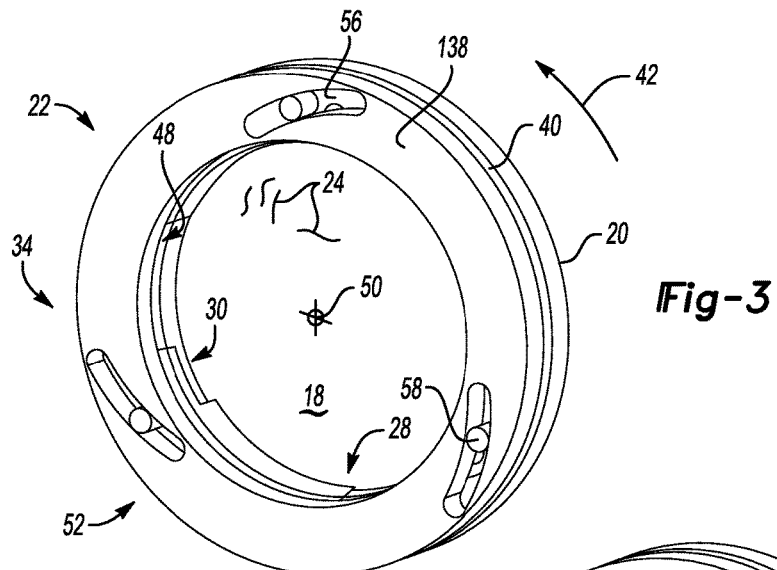
FIG. 3 is a schematic illustration of an end view of another embodiment of the wiper assembly of FIG. 2, wherein a wiper is disposed in a stowed position.
Figure 4:
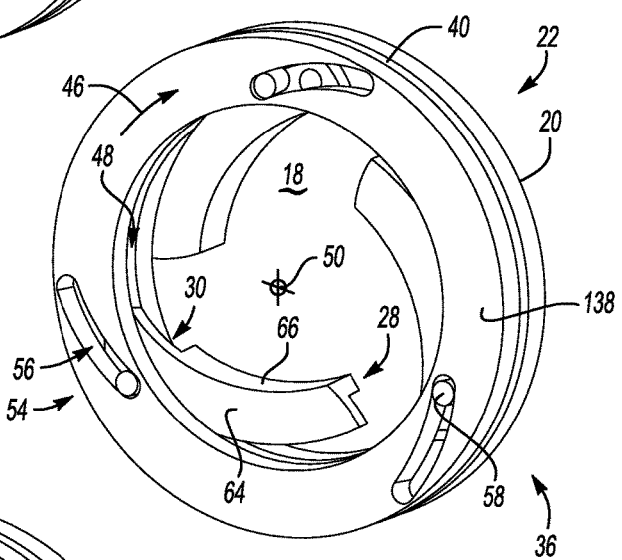
FIG. 4 is a schematic illustration of the wiper assembly of FIG. 3, wherein the wiper partially rotates between the stowed position and a deployed position.
Figure 5:
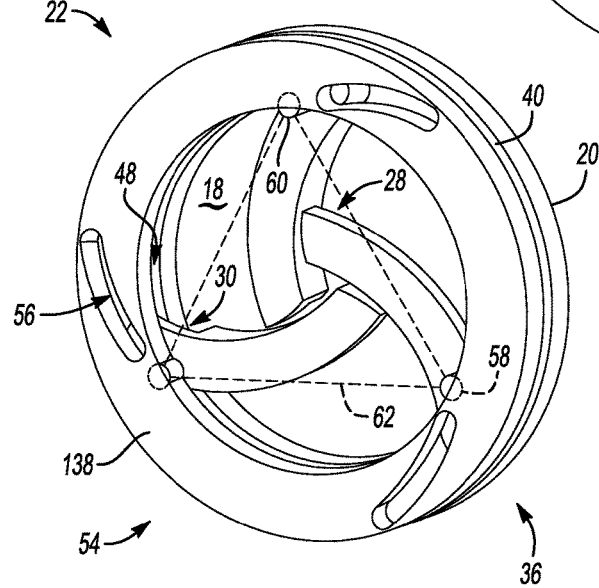
FIG. 5 is a schematic illustration of the wiper assembly of FIGS. 3 and 4, wherein the wiper is disposed in the deployed position.

As shown in FIGS. 3-5, the counterweight 138 may define a slot 56 therein having a curvilinear shape. Further, the wiper 26 may include a pin 58 extending from the first end 28 and disposed within the slot 56. The pin 58 may be translatable within the slot 56 as the wiper 26 rotates between the stowed position 34 (FIG. 3) and the deployed position 36 (FIGS. 4 and 5). That is, the slot 56 may guide the pin 58 along a defined path to thereby rotate and deploy the wiper 26. More specifically, the wiper 26 is rotatable about the pivot axis 32 between the stowed position 34 in which the first end 28 is disposed within the channel 48 such that the wiper 26 contacts the ring 20 when the counterweight 138 is disposed in the first position 52 (FIG. 3), and the deployed position 36 in which the first end 28 is not disposed within the channel 48 such that the wiper 26 contacts the lens 18 when the counterweight 138 is disposed in the second position 54 (FIG. 5). That is, the wiper 26 may not contact the lens 18 when the counterweight 138 is disposed in the first position 52, and the wiper 26 may be selectively deployable.

Stated differently, the eccentrically-distributed mass of the counterweight 138 may balance the spring force 42 of the resilient member 40 to bias the counterweight 138 to the first position 52 so that the wiper 26 is disposed in the stowed position 34 by default. However, when the camera 12 is jostled or bumped, the eccentrically-distributed mass of the counterweight 138 may overcome the spring force 42 of the resilient member 40 and induce the counterweight 138 to rotate to the second position 54 so that the wiper 26 rotates to the deployed position 36 and wipes across the lens 18.

As further described with reference to FIGS. 3-5, the wiper assembly 22 may include a plurality of wipers 26 each configured for contacting and wiping the lens 18 and each having a first end 28 and a second end 30 spaced apart from the first end 28. That is, in one non-limiting embodiment, the wiper assembly 22 may include exactly three wipers 26 each having a curvilinear shape and arranged so as to rotate and converge across the lens 18.

More specifically, each of the plurality of wipers 26 may be rotatable about a respective one of a plurality of pivot axes 32 between the stowed position 34 in which the wiper 26 contacts the ring 20 and the deployed position 36 in which the wiper 26 contacts the lens 18. For example, as best shown in FIG. 5, each of the plurality of pivot axes 32 may be spaced apart from and parallel to one another along the ring 20 and may be a vertex 60 of an equilateral triangle 62. Further, the counterweight 138 may be attached to the plurality of wipers 26, e.g., at the respective second end 30 of each of the plurality of wipers 26. The counterweight 138 is rotatable with respect to the ring 20 about the axis of rotation 50 between the first position 52 in which each of the plurality of wipers 26 is disposed in the stowed position 34 (FIG. 3), and the second position 54 in which each of the plurality of wipers 26 is disposed in the deployed position 36.

Therefore, as the camera 12 is jostled or jounced, the first end 28 of each of the plurality of wipers 26 may travel toward the first end 28 of another one of the plurality of wipers 26 as the counterweight 138 rotates from the first position 52 to the second position 54. As such, the plurality of wipers 26 may deploy and the first end 28 of each of the plurality of wipers 26 may converge toward the geometric center of the lens 18, wipe across the lens 18, and thereby clear the lens 18 of debris 24.

More specifically, as best shown in FIGS. 3 and 4, each of the plurality of wipers 26 may include an arm 64 and a flange 66 extending from the arm 64. The flange 66 may be arranged to contact the lens 18 as the arm 64 rotates across the lens 18. That is, when the counterweight 138 is disposed in the first position 52, the flange 66 may abut the counterweight 138 and the arm 64 may be disposed within the channel 48. However, when the counterweight 138 is disposed in the second position 54, i.e., when the counterweight 138 rotates to overcome the spring force 42 of the resilient member 40 due to a jostle or jounce, the flange 66 may contact the lens 18 when the counterweight 138 is disposed in the second position 54.

Therefore, a vehicle lens wiper assembly, i.e., the camera system 10, is disclosed. As set forth above, the vehicle lens wiper assembly includes the lens 18 and the wiper 26 configured to wipe the lens 18. The wiper 26 is connected to an offset weight, e.g., the counterweight 38, 138, which causes the wiper 26 to move when the vehicle jounces.

The aforementioned camera system 10 provides excellent image quality and lens life for cameras 12 exposed to harsh environmental conditions. That is, the camera system 10 provides cleaning and wiping functionality for cameras 12 exposed to dirt, dust, debris, ice, snow, water, and the like. In particular, the wiper assembly 22 including the wiper 26 that is automatically deployed as the counterweight 38, 138 overcomes the resilient member 40 may optimize the performance, functionality, and lifespan of cameras 12 exposed to the elements during operation.

More specifically, mechanical actuation of the wiper 26 protects and/or cleans the lens 18 and does not require a source of electricity or heat. By cleaning and protecting the lens 18, debris, dust, and/or ice build-up on the lens 18 may be minimized and the camera 12 may provide optimized image quality. In addition, the camera system 10 including the wiper assembly 22 is economical and may be tightly packaged to provide the aforementioned advantages. That is, the wiper assembly 22 may provide an easily-packaged actuator for the camera 12 and allows for, for example, on-vehicle cameras 12 that are configured to provide excellent image quality without frequent cleaning and/or maintenance.

While the best modes for carrying out the disclosure have been described in detail, those familiar with the art to which this disclosure relates will recognize various alternative designs and embodiments for practicing the disclosure within the scope of the appended claims.

The invention claimed is:
1. A camera system comprising:
 a body defining a cavity;
 a camera attached to the body within the cavity and including:
  a lens; and
  a ring surrounding the lens; and a wiper assembly attached to the camera and configured for clearing debris from the lens, wherein the wiper assembly includes:
a wiper configured for contacting and wiping the lens and having a first end and a second end spaced apart from the first end;
wherein the wiper is rotatable about a pivot axis between a stowed position in which the wiper contacts the ring and a deployed position in which the wiper contacts the lens;
a counterweight attached to the second end and configured for disposing the wiper in the deployed position; and
a resilient member attached to the ring and configured for disposing the wiper in the stowed position.

2. The camera system of claim 1, wherein the pivot axis is perpendicular to the ring.

3. The camera system of claim 2, wherein the resilient member is rotatable about the pivot axis.

4. The camera system of claim 1, wherein the counterweight has a weight and the resilient member has a spring force, and further wherein the spring force is equal to the weight when the camera is stationary and the wiper is disposed in the stowed position.

5. The camera system of claim 4, wherein the weight is greater than the spring force when the wiper rotates from the stowed position to the deployed position.

6. The camera system of claim 1, wherein the wiper has a curvilinear shape that conforms to the lens when the wiper is disposed in the deployed position.

7. The camera system of claim 1, wherein the wiper assembly includes exactly one wiper.

8. A camera system comprising:
a body defining a cavity;
a camera attached to the body within the cavity and including:
a lens; and
a ring surrounding the lens; and
a wiper assembly attached to the camera and configured for clearing debris from the lens, wherein the wiper assembly includes:
a wiper configured for contacting and wiping the lens and having a first end and a second end spaced apart from the first end;
wherein the wiper is rotatable about a pivot axis between a stowed position in which the wiper contacts the ring and a deployed position in which the wiper contacts the lens;
a counterweight attached to the second end and configured for disposing the wiper in the deployed position, wherein the counterweight covers and is spaced apart from the ring to define a channel therebetween;
wherein the counterweight is rotatable with respect to the ring about an axis of rotation between a first position and a second position, and has a mass that is eccentrically distributed about the axis of rotation; and
a resilient member configured for rotating the counterweight from the second position to the first position, wherein the resilient member is attached to the ring and the counterweight;
wherein the wiper is rotatable about a pivot axis between:
a stowed position in which the first end is disposed within the channel such that the wiper contacts the ring when the counterweight is disposed in the first position; and
a deployed position in which the first end is not disposed within the channel such that the wiper contacts the lens when the counterweight is disposed in the second position.

9. The camera system of claim 8, wherein the counterweight defines a slot therein having a curvilinear shape.

10. The camera system of claim 9, wherein the wiper includes a pin extending from the first end and disposed within the slot.

11. The camera system of claim 10, wherein the pin is translatable within the slot as the wiper rotates between the stowed position and the deployed position.

12. The camera system of claim 8, wherein the resilient member is disposed within the channel.

13. A camera system comprising:
a body defining a cavity;
a camera attached to the body within the cavity and including:
a lens; and
a ring surrounding the lens; and
a wiper assembly attached to the camera and configured for clearing debris from the lens, wherein the wiper assembly includes:
a plurality of wipers each configured for contacting and wiping the lens and each having a first end and a second end spaced apart from the first end;
wherein each of the plurality of wipers is rotatable about a respective one of a plurality of pivot axes between a stowed position in which the wiper contacts the ring and a deployed position in which the wiper contacts the lens;
a counterweight attached to the plurality of wipers and configured for disposing the plurality of wipers in the deployed position, wherein the counterweight covers and is spaced apart from the ring to define a channel therebetween;
wherein the counterweight is rotatable with respect to the ring about an axis of rotation between a first position in which each of the plurality of wipers is disposed in the stowed position and a second position in which each of the plurality of wipers is disposed in the deployed position;
wherein the counterweight has a mass that is eccentrically distributed about the axis of rotation; and
a resilient member configured for rotating the counterweight from the second position to the first position, wherein the resilient member is disposed within the channel and attached to the ring and the counterweight.

14. The camera system of claim 13, wherein the first end of each of the plurality of wipers travels towards the first end of another one of the plurality of wipers as the counterweight rotates from the first position to the second position.

15. The camera system of claim 13, wherein each of the plurality of wipers includes an arm and a flange extending from the arm.

16. The camera system of claim 15, wherein the flange abuts the counterweight and the arm is disposed within the channel when the counterweight is disposed in the first position.

17. The camera system of claim 15, wherein the flange contacts the lens when the counterweight is disposed in the second position.

18. The camera system of claim 13, wherein each of the plurality of pivot axes is spaced apart from and parallel to one another along the ring and is a vertex of an equilateral triangle.

19. The camera system of claim 13, wherein the wiper assembly includes exactly three wipers each having a curvilinear shape.

* * * * *